Jan 6, 1931.  E. A. LEDERER  1,787,690
RECTIFIER
Filed Nov. 13, 1924
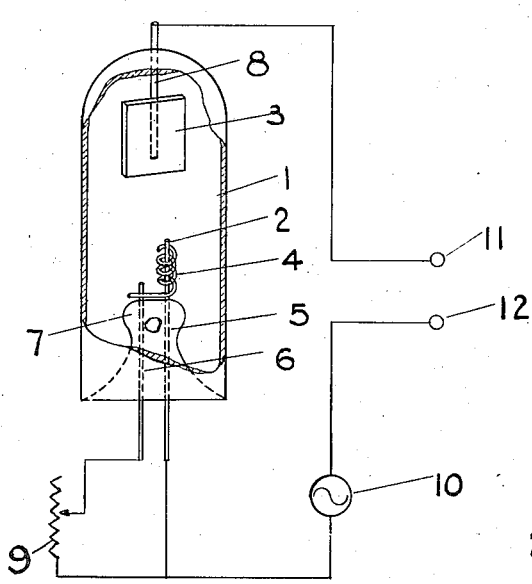
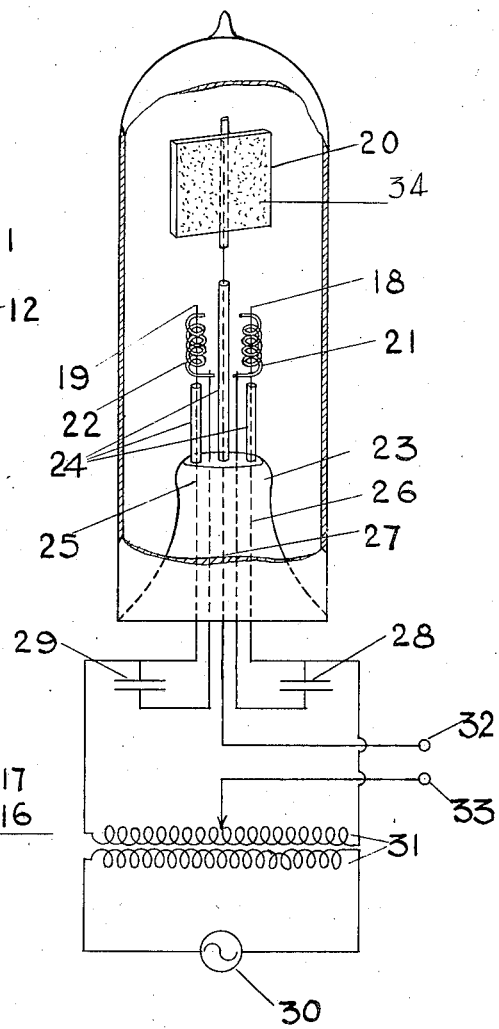
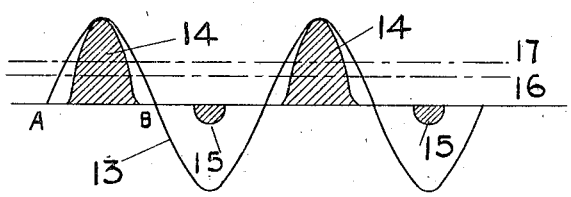
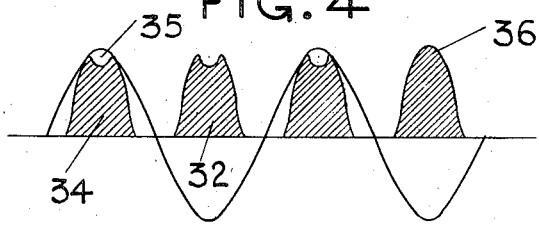
INVENTOR
ERNEST A. LEDERER
BY
ATTORNEY Patented Jan. 6, 1931

1,787,690

UNITED STATES PATENT OFFICE

ERNEST ANTON LEDERER, OF EAST ORANGE, NEW JERSEY, ASSIGNOR TO WESTINGHOUSE LAMP COMPANY, A CORPORATION OF PENNSYLVANIA

RECTIFIER

Application filed November 13, 1924. Serial No. 749,593.

This invention relates to a rectifier for electrical currents and more particularly to a rectifier for converting alternating currents into direct currents in which the discharge takes place in a rarefied gaseous atmosphere.

In a copending application entitled, Rectifier, Serial No. 728,988, filed July 29, 1924, assigned to Westinghouse Lamp Co., I have disclosed a rectifier designed for operation on the ordinary commercial lighting circuit of 110 or 220 volts which is particularly suitable for supplying current for the plate circuit of the radio tubes of radio receiving apparatus.

Briefly, the rectifier set forth in said copending application, comprises an envelope having a filling of gas at a relatively low pressure, preferably a rare gas as neon or helium or a mixture of rare gases, a plurality of electrodes of small area which may, for convenience, be termed ionizing electrodes arranged relatively close together and adapted to have alternating current impressed thereon to produce a low potential discharge therebetween to ionize the gaseous medium within the envelope, and one or more additional electrodes of relatively large area cooperating with the ionizing electrodes to rectify the alternating current impressed thereon by a point to plate discharge.

The filling of rare gas reduces the starting potential of the rectifier. The cathode fall and consequently the potential drop between the electrodes from which direct current is obtained, may be further reduced by coating the cathode with an alkali metal such as potassium, sodium, rubidium, caesium, lithium or alloys thereof, preferably vaporized onto the cathode after it is sealed into the envelope.

A rectifier constructed in accordance with the application above referred to, using potassium metal on the cathode and having a filling of neon gas, may be operated on potentials of 220 volts and direct current obtained therefrom at approximately 150 volts with a current flow of from 0.5 to 120 milliamperes. The output voltage, however, may be varied by varying the alkali metal used on the cathode or by varying the character of the gas used in the rectifier.

I have found with a point to plate rectifier of the type set forth in said copending application, that while high efficiency is obtained and very nearly all of the alternating current is rectified, still a slight discharge takes place in the rectifier in a direction opposite to that in which the discharge normally takes place and which opposes the direct current flow, thereby slightly impairing the efficiency of the rectifier.

One of the objects of the present invention is to produce a point to plate rectifier which will have a substantial increase in efficiency.

Another object is to produce a rectifier of the discharge type which will be an absolute valve.

Another object is to produce a rectifier of the discharge type in which the discharge in one direction will be entirely suppressed or neutralized.

Another object is to produce a point to plate rectifier in which a flow of electrons from the point electrode to the plate electrode will be entirely prevented.

Other objects and advantages will hereinafter appear.

The small discharge in a direction opposite to the normal direct current flow in rectifiers of this type, as hitherto constructed, appears to be due mainly to two causes. During a portion of the alternating current cycle, the anode or point electrode becomes negative with respect to the cathode or plate electrode and while with the proper gas pressure in the device, spacing, size and shape of the electrodes, the discharge between these electrodes may be almost entirely suppressed at this time, yet at the very peak of the alternating current wave, a small discharge may pass in a direction contrary to the normal current flow therethrough, thus impressing on the output circuit a small amount of current in opposition to the normal direct current flow. The second cause of this reverse current discharge is thought to be due to the cloud of electrons which surround the anode or are en route from the cathode to the anode when a reversal in the anode current occurs. These negatively charged electrons, when the anode changes sign and becomes negative, are repulsed by the anode and foi ed back or attracted to the cathode in opposition to the normal output current.

In accordance with this invention an auxiliary electrode or conductor is disposed adjacent the anode and charged oppositely to the anode so that any tendency for stray or reverse discharges to take place between the anode and cathode will be overcome and the cloud of electrons surrounding the anode at the end of the half cycle will be drawn to the auxiliary electrode rather than to the cathode and thereby quickly disposed of.

The auxiliary electrode, which may be termed a neutralizing electrode, may be in the form of a spiral or cylinder surrounding the anode or it may be otherwise shaped and differently arranged, the essential feature being that it be so disposed and charged with respect to the anode that any electrons emanating from the anode will be attracted to the neutralizing electrode rather than to the cathode and any electrons en route to the anode at the time it changes polarity, will be drawn to the auxiliary or neutralizing electrode rather than being forced back to the cathode.

The opposition in polarity between the anode and the neutralizing electrode may be accomplished by connecting the auxiliary or neutralizing electrode to the anode, either within or without the envelope of the rectifier, through a condenser of the proper capacity. If desired, in place of such condenser, a high resistance leakage path might be provided. In the latter case, advantage would be taken of the time lag occasioned by the resistance, for the charge on the neutralizing electrode to change with the main electrode, to cause the neutralizing electrode to accumulate a charge contrary in sign to the main electrode. By adjusting the resistance of the leakage path in proper relationship to the frequency of the current, that is, so that the charge on the neutralizing electrode lags half a cycle behind the charge on the anode, it is obvious that the neutralizing electrode may be continuously maintained charged oppositely to the anode.

In order that this invention may be more fully understood, reference will be had to the accompanying drawings in which:

Fig. 1 is a sectional view of a half wave rectifier embodying the invention.

Fig. 2 is an oscillographic curve showing the relation of the rectified current to the input current of a rectifier of the point to plate type as hitherto constructed;

Fig. 3 is a sectional view of a full wave rectifier embodying the invention; and, Fig. 4 is an oscillographic curve similar to that of Fig. 2 for a full wave rectifier.

The rectifier shown in Fig. 1 comprises an envelope 1 having a filling of rare gas such as neon or helium or a mixture of rare gases, an anode 2, a cathode 3 and an auxiliary or neutralizing electrode 4. The anode 2 is in the form of single wire to form a substantially pointed electrode or if desired, the electrode might be made of larger size and the end tapered to a point, as is well known in the construction of point to plate rectifiers. The cathode 3 is of relatively large size whereby a discharge may be caused to pass substantially in one direction only between such cathode and the anode. Rectifiers of this type are well known in the art and further description of the construction or the theory of operation thereof is believed unnecessary.

The neutralizing or auxiliary electrode 4 is in the form of a coil or spiral disposed around the anode 2, although it may be otherwise formed and disposed with respect to the anode so long as it functions in the manner which will hereinafter fully appear.

The electrodes 2 and 4 are joined to or form continuations of the leading-in conductors 5 and 6 respectively, sealed through the stem 7 and the electrode 3 is joined to and supported by the conductor 8 sealed through the envelope.

In order to maintain the electrode 4 opposite in polarity to the anode 2, the leading-in conductors 5 and 6 are connected together through the high resistance leakage path 9. By properly adjusting the value of the resistance, the lag of the charge on the neutralizing electrode may be so timed that the neutralizing electrode will always be maintained oppositely charged to the anode 2.

Alternating current may be supplied to the rectifier from any desired source, as from an A. C. generator 10 and direct current impulses may be obtained between the terminals 11 and 12, joined to the cathode 3 and generator 10 respectively.

In Fig. 2 I have shown a curve representing the relation of the output current to the input current of point to plate rectifiers, as heretofore constructed. The curve shows the usual sine wave 13, representing the alternating current input. The output current is represented by the shaded portions 14 and 15. The portions 14 indicate the normal direct current output and the portions 15 the unrectified or reverse current portion which it is the function of the present invention to eliminate.

The average output of the rectifier as heretofore constructed, is represented in Fig. 2 by the line 16 and may be determined from the arithmetic sum of the rectified portions 14 minus the sum of the unrectified portions 15 of the impressed current. I have found that by disposing the neutralizing electrode 4 adjacent the anode 2 and charging such neutralizing electrode oppositely to the anode that the unrectified portion 15 of the curve may be entirely suppressed thus making of the rectifier, an absolute valve. Obviously, by so eliminating the counter current represented by the shaded portion 15, an increase in the average output will be obtained. This is indicated in Fig. 2 by the line 17.

It is believed that the theory of operation of the auxiliary electrode is as follows although it is to be understood that I do not desire to be limited by any particular theory. During the portion A—B of the alternating current wave, the anode 2 is positive and cathode 3 negative. At this time, electrons emitted from the cathode flow freely to the anode, such flow being indicated by the portion 14 of the curve. At the instant the current decreases to zero, there is a cloud of electrons surrounding the anode and en route from the cathode to the anode and as the anode becomes negatively charged these electrons are normally forced back to the cathode 3 which at this time is becoming positively charged. This return flow of electrons impresses on the output circuit a slight current in opposition to the normal flow. This is indicated by the portion 15 of the curve. By disposing the neutralizing electrode 4 adjacent the anode 2, and charging it oppositely thereto, this cloud of electrons instead of being attracted back to the plate 3 are drawn to the electrode 4. Furthermore, when the anode becomes fully charged negatively and the plate charged positively, there appears to be a slight emission of electrons from the anode which, in the absence of neutralizing electrode 4, pass from the point electrode to the plate electrode. These electrons, however, in the present construction are prevented from passing to the plate by the electrode 4 which being positively charged at this time, attracts the electrons thereto.

The charge on the auxiliary electrode during operation of the rectifier is so slight as compared with the charge on the anode, that the normal flow of electrons from the cathode to the anode is not affected thereby, this small charge, however, being sufficient to take care of any electrons emitted by the anode and the electrons surrounding the anode when a reversal of the alternating current occurs.

In Fig. 3, I have shown my invention applied to a full wave rectifier. The rectifier shown in this figure has a pair of anodes 18 and 19, cathode 20 and neutralizing electrodes 21 and 22 all of such electrodes being joined to leading-in wires sealed through the press 23. Glass tubes 24 may be disposed about the leading-in wires 25, 26 and 27, to prevent stray discharges from passing therebetween. The electrodes 18 and 21 are connected together through the condenser 28 and electrodes 19 and 22 are connected together through the condenser 29. As is well known, the opposite plates of the condenser are oppositely charged and the neutralizing electrodes will, therefore, always be maintained oppositely charged to the anode which they surround. Alternating current from any suitable source, as the generator 30 may be supplied to the rectifier through the transformer 31, the opposite ends of the secondary winding of which are connected to the anodes 18 and 19. Direct current is obtained from between the cathode 20 and the mid portion of the transformer secondary at the terminals 32 and 33.

The rectifier of Fig. 3 may have a filling of an ionizable gas, as neon or helium, or a mixture of gases and the cathode preferably has an alkali metal 34, as potassium or sodium deposited thereon to lower the cathode fall. By virtue of the grid like construction of the neutralizing conductors 21 and 22 a small discharge takes place, through the turns of the conductors, between the anodes 18 and 19 which ionizes the gas within the device and permits a low voltage direct current discharge to take place alternately between the anodes 18 and 19 and the cathode 20 and any tendency for the discharge to pass in the opposite direction between the cathode and anode is suppressed by the neutralizing electrodes 21 and 22.

Fig. 4 represents a curve showing the manner in which the efficiency of full wave rectifiers is affected by the counter electromotive force set up by the stray discharges within the rectifier. It will be noted that the peak of each wave 34 representing the impulses of rectified current, when the neutralizing electrodes 18 and 19 are not in operation, is depressed or blunted, as at 35. These curves when the auxiliary electrodes are in operation, are full rounded at the peak as shown at 36 in the right hand side of Fig. 4, thus increasing the efficiency and output of the device.

This invention is susceptible to many variations and modifications and I do not desire to limit myself, therefore, to the particular embodiments shown and described herein.

What is claimed is:

1. A gaseous discharge device comprising a casing containing an ionizable gas, a cathode and a pair of anodes within said casing and a conductor disposed adjacent each of said anodes for suppressing the discharge in one direction between the anodes and the cathode, said conductors having openings therein between the anodes to permit a discharge to pass from one anode to the other.

2. A rectifier for alternating current comprising a casing containing an ionizable gas, a cathode and a pair of anodes within said casing and a conductor disposed around each of said anodes for suppressing the discharge in one direction between the anodes and the cathode, said conductors having apertures therein between said anodes through which a discharge from one anode to the other may take place.

3. A rectifier for alternating current comprising a casing containing an ionizable gas, a cathode and a pair of anodes therein and a grid arranged about each of said anodes for suppressing the discharge in one direction between the anode and the cathode, said grids having openings therein through which a direct discharge between said anodes may pass.

4. A rectifier for alternating current comprising a casing containing an ionizable gas, a cathode and a pair of anodes therein and a conductor coiled about each of said anodes for suppressing a discharge in one direction between the anodes and the cathode, the coils of said conductors being spaced apart so as to permit a discharge to take place therethrough from one anode to the other.

5. An alternating current rectifier comprising a gas tight enclosure containing an ionizable gas, a cathode and an anode within the enclosure, an auxiliary electrode therein for cooperation with said anode to ionize said gas and a shield adjacent the anode for suppressing undesirable discharges between the anode and the cathode, and apertures in said shield between said anodes for permitting a discharge to pass between the anode and the auxiliary electrode.

6. An alternating current rectifier comprising a gas tight enclosure containing an ionizable gas, a cathode and an anode within the enclosure, an auxiliary electrode therein cooperating with said anode to ionize said gas and a grid electrode disposed around said anode for suppressing undesirable discharges between the anode and cathode, and having apertures therein for permitting a discharge to pass between the anode and auxiliary electrode.

7. In a gaseous discharge rectifier, the combination with a cathode, of a plurality of anodes, means for causing a glow discharge to operate successively from each of said anodes to the cathode, a conducting member associated with each of the anodes, means for imparting a positive charge to each of said conducting members, when the anodes become negatively charged, said conducting members being apertured in the portions of said members which lie between the anodes to permit a discharge to pass between said anodes.

8. In a gaseous discharge rectifier, the combination with a cathode, of a plurality of anodes, means for causing a glow discharge to operate successively from each of the anodes to the cathode, a grid disposed about each of the anodes, and means for impressing a positive charge on each of said grids when the anodes become negatively charged, said grids having apertures in the portions disposed between said anodes to permit a discharge between the anodes.

In testimony whereof, I have hereunto subscribed my name this 11th day of November, 1924.

ERNEST ANTON LEDERER.